(12) United States Patent
Li et al.

(10) Patent No.: US 7,844,720 B2
(45) Date of Patent: Nov. 30, 2010

(54) MANAGING DATABASE CONNECTIONS

(75) Inventors: Ying Li, Beijing (CN); Ying Chen, Beijing (CN); Jie Qiu, Beijing (CN); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 12/164,065

(22) Filed: Jun. 29, 2008

(65) Prior Publication Data
US 2009/0234957 A1    Sep. 17, 2009

(30) Foreign Application Priority Data
Jun. 29, 2007   (CN)   ................. 2007 1 0126874

(51) Int. Cl.
*G06F 15/16* (2006.01)
(52) U.S. Cl. ................ 709/229; 709/223; 709/200; 707/640
(58) Field of Classification Search ........... 709/200, 709/223, 229, 226; 711/162; 707/640
See application file for complete search history.

(56) References Cited

U.S. PATENT DOCUMENTS

| | | | |
|---|---|---|---|
| 6,112,196 A | 8/2000 | Zimowski et al. | |
| 6,732,360 B1 * | 5/2004 | Seo et al. | 719/310 |
| 2003/0023607 A1 | 1/2003 | Phelan et al. | |
| 2003/0214943 A1 * | 11/2003 | Engstrom et al. | 370/353 |
| 2004/0078495 A1 | 4/2004 | Mousseau et al. | |
| 2004/0088413 A1 * | 5/2004 | Bhogi et al. | 709/226 |
| 2004/0215789 A1 | 10/2004 | Lu | |
| 2004/0221031 A1 | 11/2004 | Desai | |
| 2005/0015356 A1 | 1/2005 | Ireland et al. | |

\* cited by examiner

*Primary Examiner*—Ario Etienne
*Assistant Examiner*—El Hadji Sall
(74) *Attorney, Agent, or Firm*—Jon A. Gibbons; Fleit Gibbons Gutman Bongini & Bianco PL

(57) ABSTRACT

The present invention provides a method for managing a database connection, comprising the steps of: in responsive to a connection request of a first application, allocating an available connection for the first application; if there is no available connection, selecting a held connection being used by a second application; backing up connection context of the held connection; releasing the held connection; and allocating the held connection for the first application. Since connection context of the application has been restorably backed up, a connection of the application can be cut off and the connection re-scheduled when necessary. As a result, the connection utilization rate is enhanced. The present invention further provides a device and system that can manage a database connection based on the technology of connection pools. (FIG. 5)

15 Claims, 7 Drawing Sheets

MANAGING DATABASE CONNECTIONS

CROSS-REFERENCE TO RELATED APPLICATIONS

Figure 1:
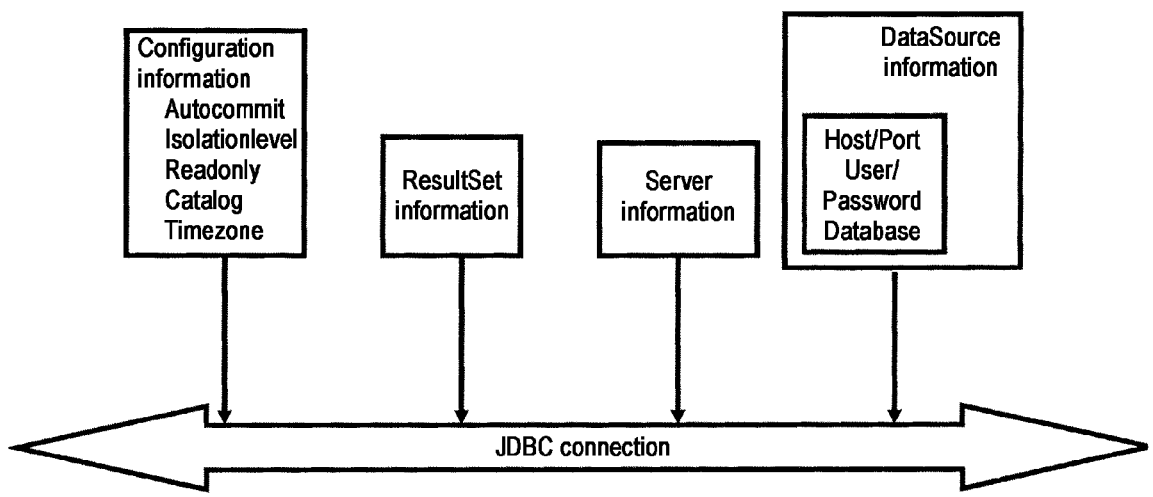

This application is based upon and claims priority from prior Chinese Patent Application No. 200710126874.1, filed on Jun. 29, 2007, the entire disclosure of which is herein incorporated by reference.

FIELD OF THE INVENTION

The present invention relates to the computer field, and in particular, to a method and system for managing a database connection.

BACKGROUND OF THE INVENTION

Nowadays a large amount of applications need to access databases in order to obtain necessary data. For example, a database-related application written in the Java language typically uses JDBC (Java Database Connection) to interact with a database. Here, a connection represents a channel, and various applications can read/write data to the database via such channels.

To access data from application, a database connection needs to be set up for each application request. Due to frequent access to the database, the operation of setting up database connections consumes a large amount of memory. To reduce memory usage, a new mechanism named "pool" is introduced into management of the connections. That is, a certain number of connections are placed in a connection pool in advance, and when a connection needs to set up, one connection is taken out of the pool and then placed back after completion. However, the management of connections via connection pools in the prior art is restricted to the basic allocation of connections. Moreover, the usage of a connection by an application, whether the usage is reasonable or not, is not under control by application server. In fact, the improper usage of a connection by an application will cause resource conflicts, thread hangs and even system crashes. There is a variety of improper usages of connections. One example of an improper usage is a connection leak, i.e. some applications fail to close a connection after obtaining it and the connection is hence held for a long time. Another example of an improper usage is an inefficient connection resource usage, i.e. a certain connection is not released to the connection pool after having been used or the connection is held for a long time without being used. Still, another example of an improper usage is deadlock, i.e. connections are invoked in a recursive way and applications thus wait for each other to get resources that are being used by others.

In the prior art there have been proposed several connection management schemes in order to solve the problem of the improper usage of connections. One technology is to manually detect connection leak on an application server (hereinafter referred to "AS" for short). In this method, a special diagnosis program is employed to detect connection leak on an AS in a poling way. The deficiency in this detection method lies in the incapability of automatically detecting connection leak, thereby causing the omission of detection. Additionally, frequent detection will lead to extra system overheads and utilization.

A second technology is to automatically detect connection problems based on timeout. Compared with the diagnosis program described previously, this technology is automatic. An AS administrator specifies a timeout for a database connection (e.g. 75 seconds as a default value) and any application that still holds connection upon expiration of the timeout will get the timeout exception and its connection will thus be reclaimed by the system. This technology is especially suitable for the deadlock. Once the deadlock occurs, connection resources in a deadlock thread will be deprived by the system due to the timeout, and the deadlock is thus unlocked. However, the deficiency in this technology is that it is difficult to determine timeouts suitable for all transactions. For example, if a thread is a transaction that consumes a long time to be completed, then the timeout that is merely suitable for an ordinary transaction will deprive this time-consuming transaction of the connection, so the time-consuming transaction cannot proceed normally. If the AS administrator specifies a too long timeout, then the system cannot respond to a problem in time and will only discover a problem long after the problem occurred. Therefore, the overall connection utilization rate will be decreased.

Another commonly used technology is to debug a program in advance, wherein the program is analyzed using program debugging tools. If an analysis result is that the program may be subject to deadlock or leak when it is run, then the programmer is notified to modify the program. It goes without saying that to debug a distributed application in a large scale enterprise environment is a labor-intensive task. Therefore, this method has relatively poor cost efficiency.

According what is needed is a method and system to over come the problems encountered in the prior art and to improved technology for managing a database connection.

SUMMARY OF THE INVENTION

The present invention provides a database connection with better utilization rate and enhances overall system performance. The present invention can save and restore connection context of a database connection and re-allocate the connection resource from one application to another application, thereby reusing the connection. The term "connection context" mentioned here means state information of a connection. When an application accesses a database using a connection, such state information will be transferred over the connection. FIG. 1 shows an example of such state information, which will be described in detail below.

In a first aspect of the present invention, there is provided a method for managing a database connection, comprising the steps of: in responsive to a connection request of a first application, allocating an available connection for the first application; if there is no available connection, selecting an allocated connection being held by a second application; backing up connection context of the held connection; releasing the held connection; and allocating the held connection for the first application.

According to another embodiment of the present invention, if the second application makes a request for restoring a previous connection state, then a new connection is allocated for the second application based on the backup of the connection context and the previous connection state is restored.

According to another embodiment of the present invention, the application may be a Java application, and the connection may be a JDBC connection. The connection context that needs to be backed up comprises Connection Objects, Statement Objects, Resultset Objects of the connection.

According to another embodiment of the present invention, during selection of a held connection, an application that has held a connection for more than a predetermined time can be selected. Alternatively, the selection can be made based on the Least Recently Used (LRU) algorithm.

According to another embodiment of the present invention, a correspondence is established between connection context of the held connection and a key. For example, when connection context is being backed up, the application's connection context is placed to an index table along with the key, the connection context is taken out of the index table according to the key if necessary, and a new connection is allocated for the application based on the connection context and a previous connection state is restored. The key may be any character or an identifier capable of uniquely identifying a statement of the application, such as specific information in the connection context.

In another embodiment of the present invention, there is provided a database connection manager, comprising: connection context backup means for backing up context of a connection; and connection scheduling means for scheduling the connection. The connection scheduling means comprises: means that allocates an available connection for a first application in responsive to a connection request of the first application; means that selects a held connection being used by a second application if there is no available connection; means that controls the connection context backup means to back up connection context of the held connection; means that releases the held connection; and means that allocates the held connection for the first application.

In a third aspect of the present invention, there is provided a system for managing a database connection, comprising applications, a connection manager and a connection pool, wherein the connection manager can back up and restore the application's connection context and re-schedule a connection using the method described above.

In a connection pool management solution of the prior art, an application gets a connection from a connection pool directly and releases this connection upon completion of an access to a database, so that the released connection can be used by other application requesting a connection. However, if all connections in the connection pool have been held and not released by applications upon completion of an access to the database in time, then other applications requesting a connection will not get a connection to access the database. According to the method of the present invention, when an application makes a request to the connection manager for a connection, then the connection manager allocates a connection according to a current connection usage state. Specifically, when all connections in the connection pool have been allocated, the connection manager will restorably back up connection context of at least one application with held connection, reclaim at least one connection and allocate the reclaimed connection for the new application requesting a connection if a new application requests a connection, thereby re-scheduling the connection. If the application with the released connection is an application that does not need the connection any more, this improper connection allocation state is naturally ended by the aforesaid processing. If the application with the released connection has not completed the operation, it can request another connection when necessary, and the manager will restore a connection according to connection context previously backed up during the reclamation operation, so that the application's transaction can proceed with the processing before the connection interruption without re-starting the processing. Therefore, the method of the present invention can achieve dynamic and resilient management of a database connection and thereby enhancing the utilization rate of connection resources and improve the system performance.

These and other advantages of the present invention will become more apparent from the following description of other embodiments, taken in conjunction with the accompanying drawings. These embodiments are illustrative merely and not restrictive.

BRIEF DESCRIPTION ON THE DRAWINGS

Figure 2:
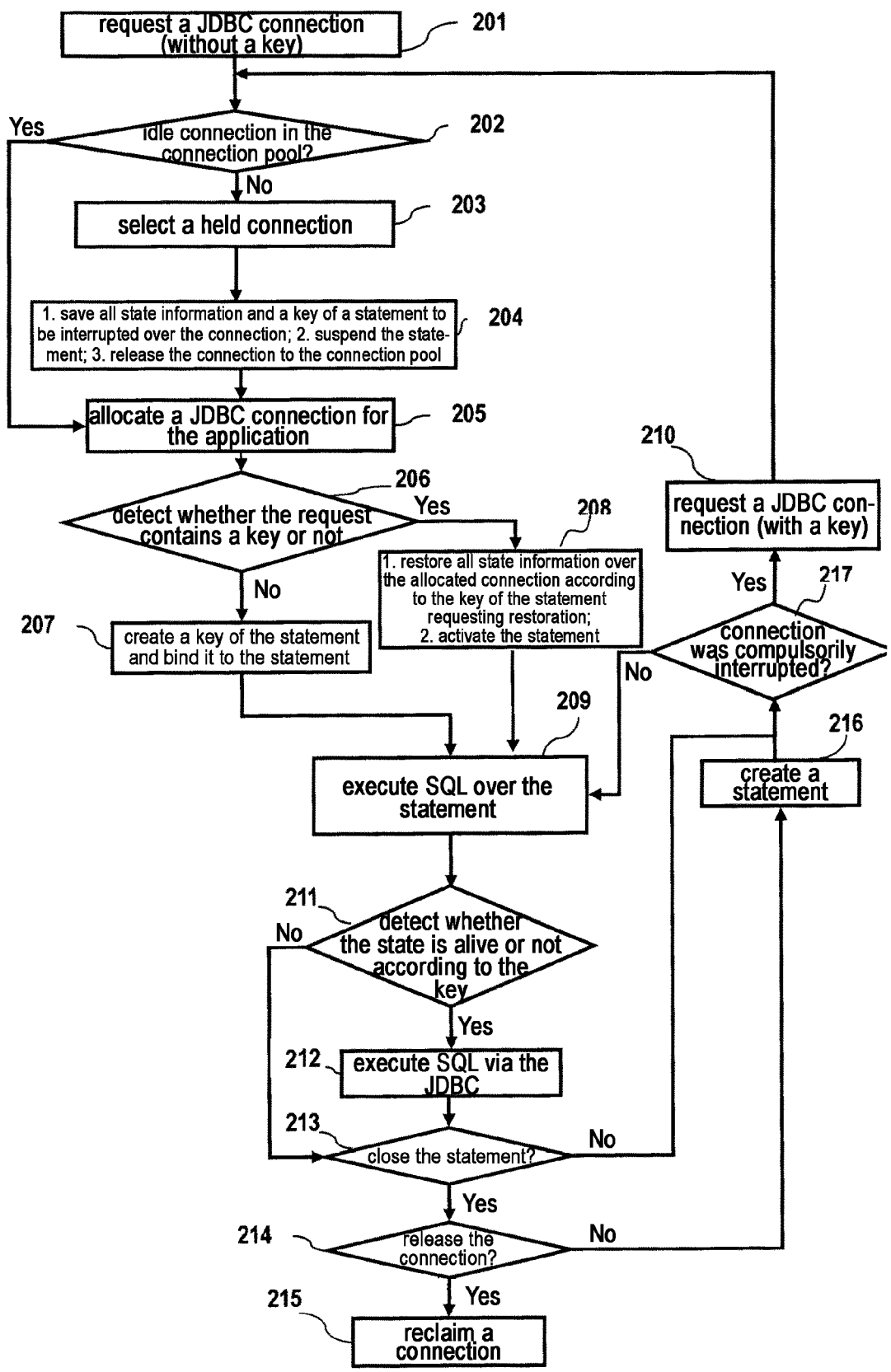
Figure 3:
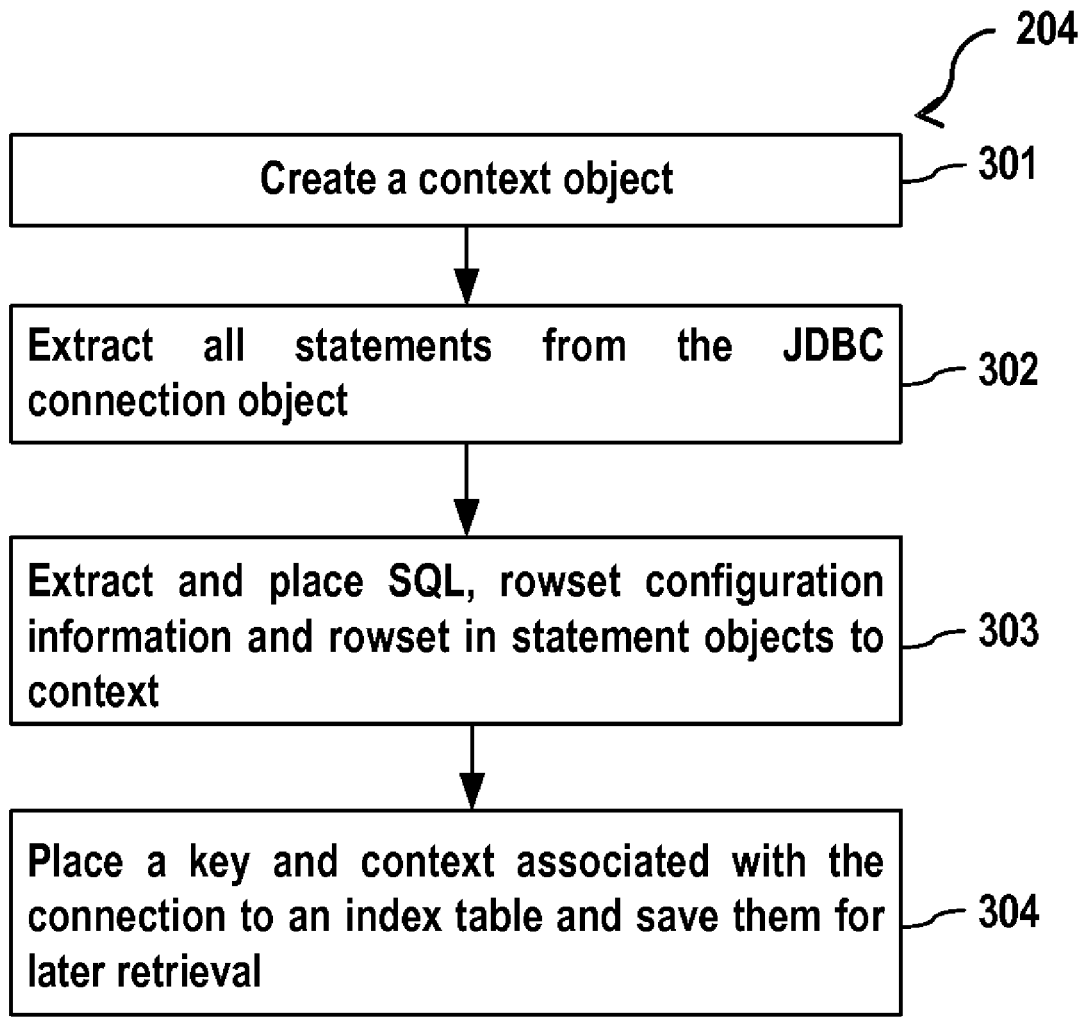
Figure 4:
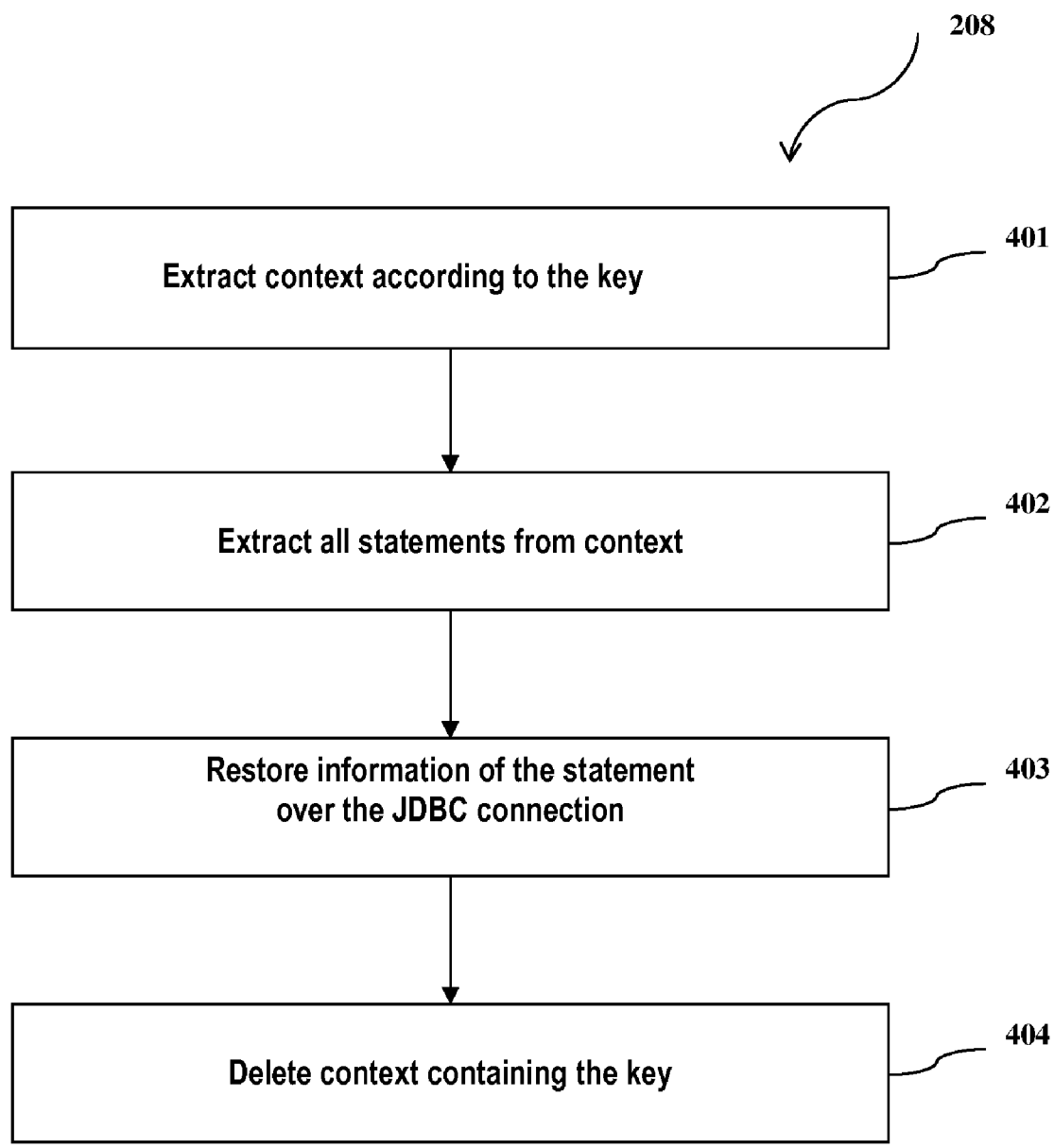
Figure 5:
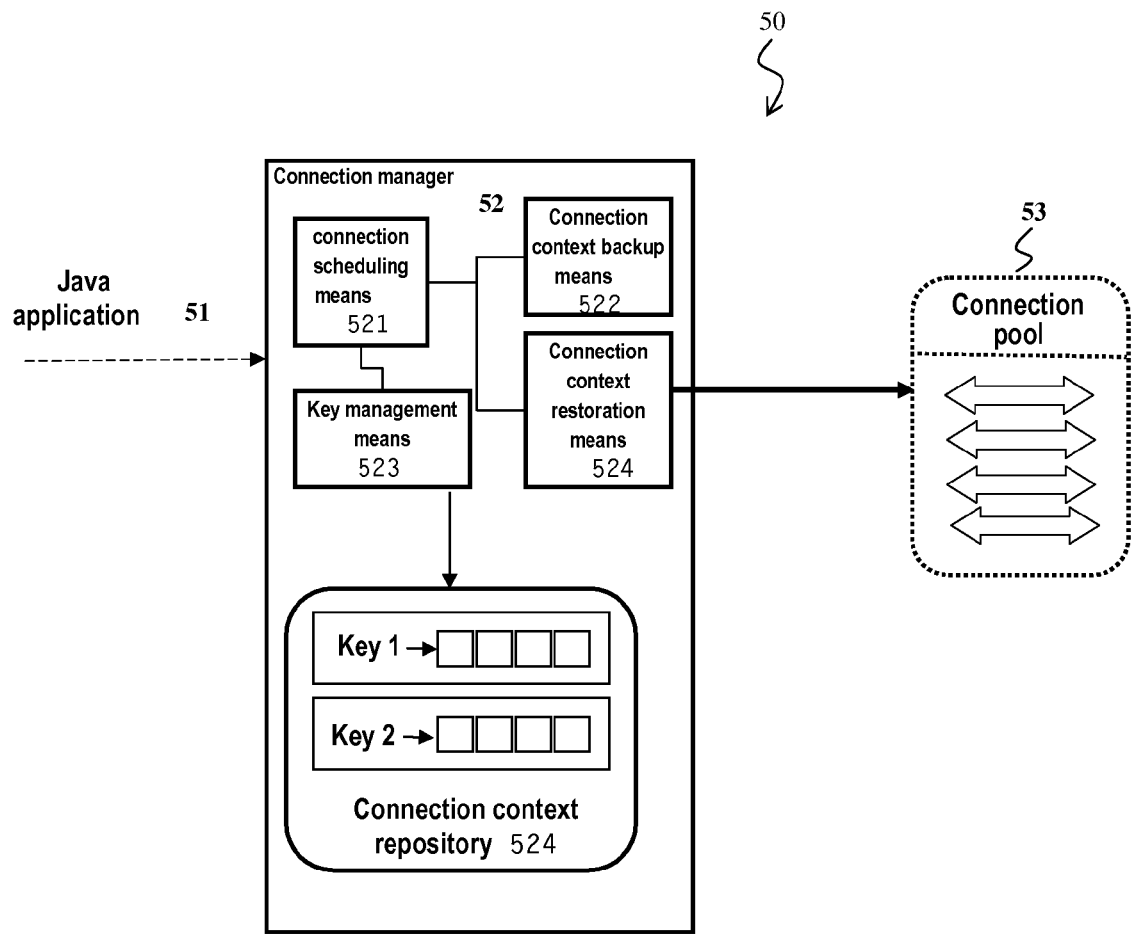
Figure 6:
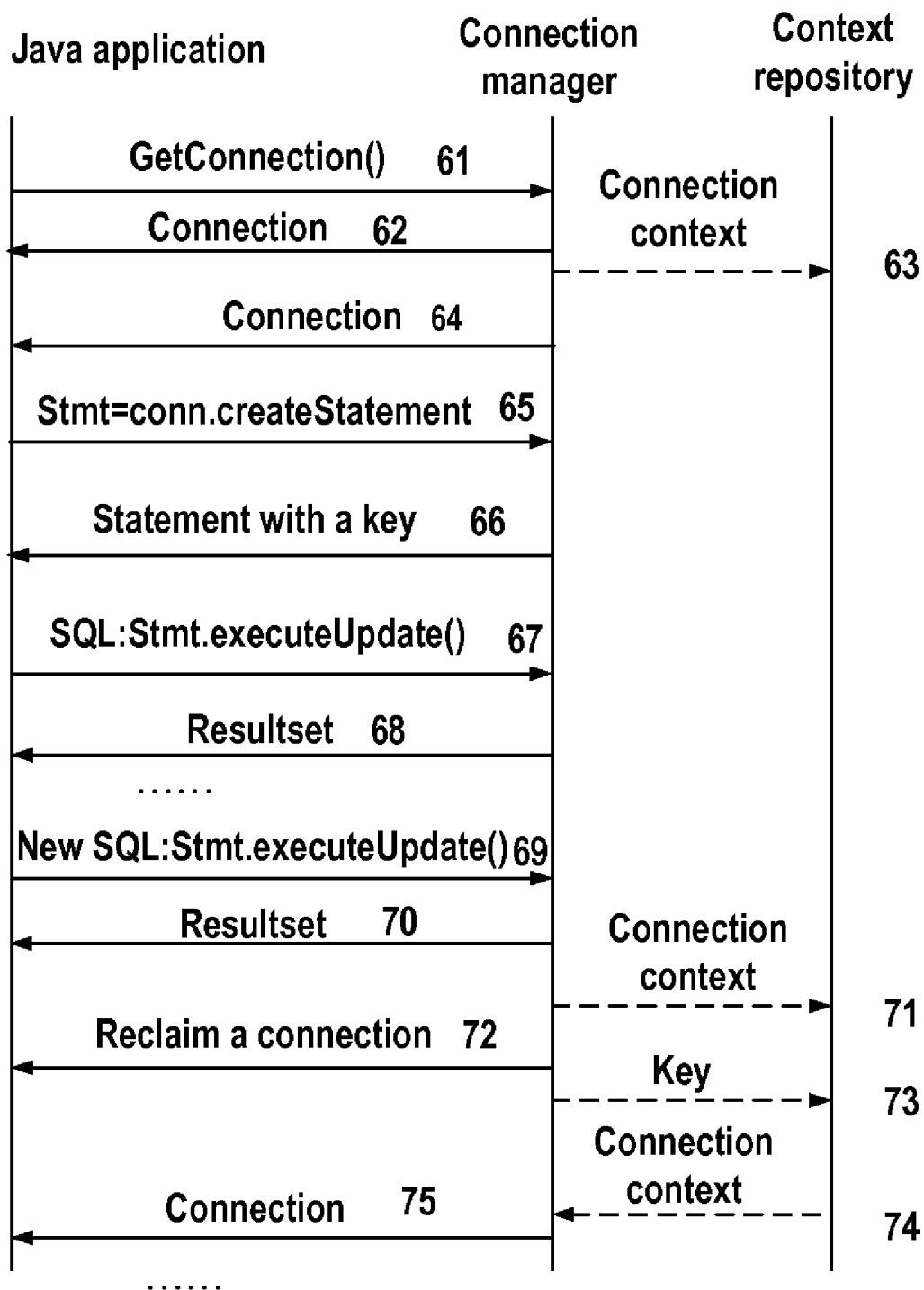
Figure 7:
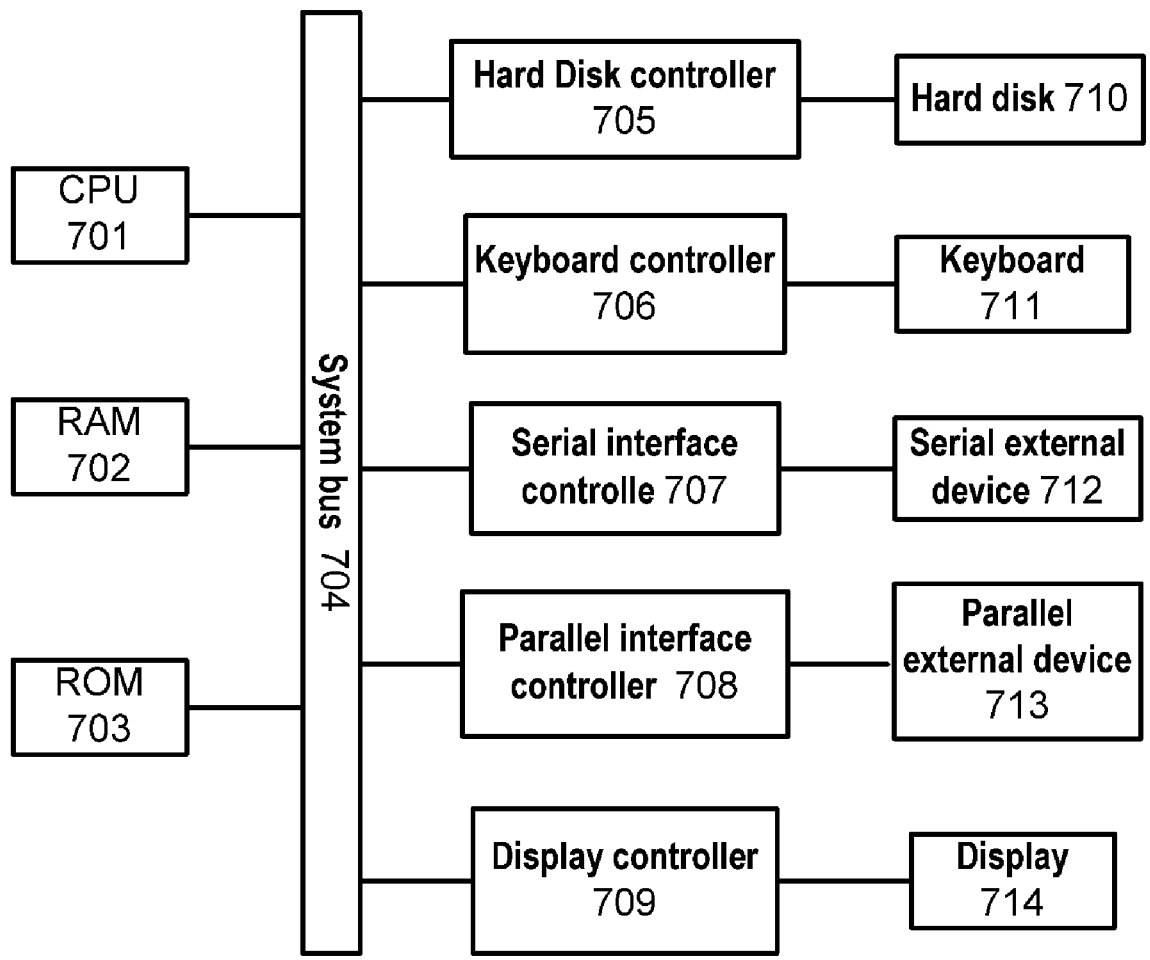

FIG. 1 schematically shows an example of connection context of an application, in which a JDBC connection according to an embodiment of the present invention;

FIG. 2 schematically shows a flowchart of a method for managing a database connection according to an embodiment of the present invention;

FIG. 3 schematically shows a flowchart of an operation for backing up connection context of a database connection according to an embodiment of the present invention;

FIG. 4 schematically shows a flowchart of an operation for restoring the database connection based on the saved connection context according to an embodiment of the present invention;

FIG. 5 schematically shows a block diagram of a system for managing a database connection which includes a database connection manager according to an embodiment of the present invention;

FIG. 6 schematically shows a procedure in which the connection manager according to an embodiment of the present invention; and FIG. 7 schematically shows a computer device in which embodiments according to the present invention can be implemented.

DESCRIPTION OF THE PREFERRED EMBODIMENTS

FIG. 1 shows an example of connection text of an application, in which a JDBC connection according to an embodiment of the present invention. Information transferred over a JDBC connection comprises: configuration information, Statement and ResultSet information, server information, DataSource information, etc. The configuration information comprises: Autocommit, Isolationlevel, Readonly, Catalog, Timezone, etc. The DataSource information comprises host/port, user/password, database, and other information. Specifically, when a database needs to be accessed, a Java application requests a connection setup, generates statements over the connection set up, executes the SQL statement on the statements, and thereby acquires a result set.

According to the present invention, connection context of the JDBC connection that needs to be backed up, i.e. state information of the JDBC connection comprises: Connection State, DataSource State, Transaction State, Statement State, and ResultSet State. Hereinafter, conceptual explanation or exemplary illustration will be given to these kinds of state information.

The Connection State comprises Server URL, User/Password, Database Name, etc. Generally speaking, when a JDBC connection needs to be set up, a driver must be downloaded first, and a driver manager then invokes a connection method of the driver and passes a URL to the driver. The syntactic format of a JDBC URL recommended by the JDBC specification is generally as follows:

jdbc: <subprotocol>:<subname>.

wherein Subprotocol defines the kind of a database connectivity mechanism that may be supported by one or more drivers. The contents and syntax of subname depend on subprotocol. Subname always includes Server Address, User Name, Password, and Database Name. For example, for the Oracle SQL *net information on the particular database called ejbdemo on the machine dbmachine, the character string url is "jdbc:oracle:thin:user/password@(description=(address_list=(address=(protocol=tcp)(host=d amachine)(port=1521)))(source_route=yes)(connect_data=(sid=ejbdemo)))."

For another example, for requesting to connect to the ejbdemo database on the local machine, the character string url is "jdbc:mysql://localhost/ejbdemo?user=user; password=pass."

An application interface of JDBC (JDBC API) defines a group of properties to identify and describe a Datasource implementation. Standard Datasource properties are as enumerated and listed in the following table.

| Property Name | Type | Description |
| --- | --- | --- |
| databaseName | String | Name of a particular database on a server |
| dataSourceName | String | A data source name, used to name an underlying XADataSource object or ConectionPoolDataSource object when pooling of connections is done |
| description | String | Description of this data source |
| networkProtocol | String | Network protocol used to communicate with the server |
| password | String | A database password |
| portNumber | int | Port number where a server is listening for requests |
| roleName | String | The initial SQL rolename |
| ServerName | String | Database server name |
| User | String | User's account name |

Samples of Transaction State include, for example, Disable Auto-Commit mode: con.setAutoCommit(false) (assume con is a Connection object).

Additionally, transaction Isolation Levels are
TRANSACTION_NONE
TRANSACTION_READ_UNCOMMITTED
TRANSACTION_READ_COMMITTED
TRANSACTION_REPEATABLE_READ
TRANSACTION_SERIALIZABLE which range from the least restrictive to the most restrictive.

Statements may be update statements such as SQL INSERT, UPDATE and DELETE, or they may be query statements using SELECT statement. Additionally, stored procedures may be invoked through a statement. Update statements such as INSERT, UPDATE and DELETE return a count that indicates how many rows were affected in the database. These statements do not return any other information. One statement is sent to each database server each time.

Statement objects are created by Connection objects. For example,
Connection conn=dataSource.getConnection(user, passwd);
Statement stmt=conn.createStatement( )

The statement may be cached and then the execution path is pre-determined on the database server allowing it to be executed multiple times in an efficient manner. Such a statement is called PreparedStatement. For example,
Connection conn=ds.getConnection(user, passwd);
PreparedStatement ps=conn.prepareStatement(
"INSERT INTO BOOKLIST" +
"(AUTHOR, TITLE, ISBN) VALUES (?, ?, ?)");
ps.setString(1, "Zamiatin, Evgenii");
ps.setString(2, "We");
ps.setLong(3, 0140185852);

Furthermore, CallableStatement is used for executing stored procedures on the database. For example,
CallableStatement cstmt=con.prepareCall("{CALL PROC(?, "Literal_Value", ?)}");
cstmt.setString(1, "First");
cstmt.setString(2, "Third").

Query statements return a JDBC row result set. Rowset is one kind of result set. Individual columns in a row are retrieved either by name or by column number. There may be any number of rows in a result set. The row result set has metadata that describes the names of the columns and their types. Main concepts associated with the result set in the JDBC specification comprise rowset type, rowset concurrency, resultset holdability, rowset object.

Rowset types comprise:
TYPE_FORWARD_ONLY
TYPE_SCROLL_INSENSITIVE
TYPE_SCROLL_SENSITIVE;
Rowset concurrency comprises:
CONCUR_READ_ONLY
CONCUR_UPDATABLE;
Resultset holdability comprises:
HOLD_CURSORS_OVER_COMMIT
CLOSE_CURSORS_AT_COMMIT.

FIG. 2 shows a flowchart of a connection management method according to a another embodiment of the present invention. The connection management method according to the present invention is now described with reference to FIG. 2.

First, an application makes a request for a JDBC connection either with or without a key. If this request contains a key, it means that the application making the request will continue an interrupted but uncompleted statement, and the key will be used as an index for restoring a statement (this situation will be described in detail hereinafter). If this request contains no key, it means that the application will start a new statement, other than continue an interrupted but uncompleted statement. The request for a JDBC connection made in step 201 is a request without a key, whereas the request for a JDBC connection made in step 210 is a request with a key.

In step 202, whether or not there is an available connection in the connection pool is decided. If there is an available connection, then the flow goes to step 205 in which a connection is allocated for the application. If there is no idle connection, then the flow goes to step 203 in which a held connection is reclaimed. If all held connections are executing statements, then the request will have to wait. If there is an idle held connection, then, preferably, a held connection is selected based on timeout or using a prior art such as LRU (Least Recently Used). A simplest selection algorithm is that there is a time stamp, which records the time when the last statement is completed, on a JDBC connection; and the connection having the largest value by subtracting the time stamp on each connection from a current time is selected for subsequent reclamation and scheduling processing.

In step 204, all state information of the selected connection and the key of a statement to be interrupted are saved, the statement is then suspended, and the selected connection is released to the connection pool finally. The key must be associated with relevant state information of the statement to be backed up. If necessary, the key can be used as an index to retrieve relevant state information of the statement so as to restore the statement. Relevant state information of the statement is called "connection context" in the present invention. The key may be saved in the same database as state information of a corresponding statement.

Afterwards, the flow goes to step 205. Since there is currently a released idle connection in the connection pool, a JDBC connection may be allocated for the application.

Step 202 to step 205 mentioned above form the main technical solution of the present invention, and the procedure in which a JDBC connection is allocated for an application is completed till step 205. Hereinafter, description will be given depending on whether there is key information in a request. If the request contains a key, it means that the request needs to restore an existing interrupted statement. If the request contains no key, it means that the request needs to create a new statement. In this case, there are comprised the following steps:

In step 206, whether or not the request contains a key is detected. If the request contains no key, then the flow goes to step 207 in which a key is created for and bound to the statement. If the request contains a key, then the flow goes to step 208 in which the previously saved connection context is retrieved using the key, state information of the connection context is restored to the connection and the statement is activated.

The performance of either step 207 or step 208 results in a connection having a key already. Therefore, in step 209, a SQL statement is executed on the activated statement.

In step 211, whether the statement is alive or not is detected according to the key. If the result is positive, then the SQL statement is executed via the JDBC connection in step 212. Then, whether the statement needs to be closed or not is decided in step 213. If the statement does not need to be closed, then the flow goes to step 217 in which whether the connection has been compulsorily interrupted or not is decided. If not, then the flow returns to step 209 in which the SQL statement is executed on the statement.

If the statement is closed in step 213, then whether the connection needs to be released or not is decided in step 214. If not, then a statement is created in step 216, and the flow subsequently goes to step 217 in which whether the connection has been compulsorily interrupted or not is decided. If not, then the flow returns to step 209 in which the SQL statement is executed on the statement.

If the connection is released in step 214, then in step 215 the connection is reclaimed, i.e. the connection is cut off, and the connection is placed in the connection pool.

If it is decided in step 217 that the connection has been compulsorily interrupted, then the flow goes to step 210 in which a request for a JDBC connection is made. Since the request contains a key associated with the statement, the flow goes to step 202 in order to acquire a new connection once again and restore the previously interrupted but uncompleted statement according to the key in the request.

In the aforesaid steps, "key" means a unique identifier for indexing connection context of a statement the application wants to restore. In concrete implementations, a key can be any character. Preferably, it can be a specific item of information or a combination of multiple items of information in connection context. The embodiments disclosed here should not be construed as limiting the present invention.

FIG. 3 shows a flowchart of an operation for backing up connection context of a database connection according to a another embodiment of the present invention. Steps shown in FIG. 3 are elaborate steps of the first part of step 204 in FIG. 2. In step 301, a context object is created for packaging and storing the above mentioned state information of the connection. In step 302, all statement objects are extracted from the JDBC connection object. In step 303, SQL, rowset configuration information and rowsets are extracted from the statement objects and then placed into the context object created in step 301. In step 304, a key associated with the statement and the context object obtained from step 303 are placed in an index table so that the context object can be retrieved according to the key and state information of the connection can be restored by the context object later.

FIG. 4 shows a flowchart of an operation for restoring the database connection based on the saved connection context according to a another embodiment of the present invention. Steps shown in FIG. 4 are elaborate steps of the first part of step 208 in FIG. 2. In step 401, the context object is extracted from the index table according to the key. In step 402, all statement objects are extracted from the context object. In step 403, all state information, including information in the statement, is restored on the allocated JDBC connection. In step 404, context containing the key is deleted from the index table. Since the connection context has been restored and will never be used, the context backup had better be deleted immediately after restoration, in order to avoid a conflict with context associated with the key of the statement, which might be backed up next time. Also, during backing up context associated with the same key, the previous context backup can be replaced by the new context backup.

FIG. 5 shows a block diagram of a system 50 for managing a database connection which includes a database connection manager according to a another embodiment of the present invention. System 50 comprises an application 51 such as a Java application and the like, a connection pool 53, and a connection manager 52 according to the present invention. Connection manager 52 can comprise connection scheduling means 521, connection context backup means 522, and connection context restoration means 522. Further, manager 52 can comprise key management means 523 and connection context repository 524.

Upon receipt of a connection request from an application, connection manager 52 detects whether or not there is an idle connection in connection pool 53. If yes, a connection is allocated for the application via connection scheduling means 521; if not, then an application that has held a connection is selected via the same. Subsequently, connection context backup means 522 backs up connection context of the selected application to connection context repository 524, suspends a statement of the connection, and releases the connection of the application. Then, connection scheduling means 521 allocates the released connection for the application that previously made a connection request. At this point, key management means 523 detects whether or not the request contains a key. If not, then a key is allocated for the application and bound to the statement. If yes, then connection context thereof is restored from connection context repository 524 via connection context restoration means 524 according to the key, and a connection is set up for the application based on the restored connection context.

FIG. 6 shows a procedure in which the connection manager according to a another embodiment of the present invention interacts with a Java application. Connection manager 52 comprises connection scheduling means 521, connection context backup means 522, connection context restoration means 524, and key management means 523 (not shown in FIG. 6 for the purpose of simplicity). In step 601, the Java applications makes a connection request GetConnection( ) to the connection scheduling means. If there is an idle connection, then the connection scheduling means allocates a connection for the Java application in step 62. Otherwise, the connection scheduling means selects a held connection, backs up connection context of the held connection to the context repository, and releases the connection in step 63 shown by a dotted line in FIG. 6. In step 64, the released connection is then allocated for the Java application. In step 65, the Java application creates a statement Stmt=conn.createStatement( ) on the connection set up. In step 66, the key management means in the connection manager generates a key for the station so that all statements on this connection then contain this key. The Java application executes on the created statement a SQL statement containing the key in step 67 and gets a returned result set in step 68. Step 67 to step 68 can be repeated until the Java application executes a new SQL statement, during which the connection manager can reclaim the connection according to needs at any time. Such resilient management is denoted using step 69. In step 69, when the Java application executes a new SQL statement, there are probably three cases. In the first case, a result set is returned in step 70. In the second case, the connection manager backs up context of the connection to the context repository in step 71 shown by a dotted line, and releases the connection in step 72. In the third case, the connection manager retrieves a key from a statement of the Java application, and extracted the context backup from the context repository according to the key in steps 73 and 74 each shown by a dotted line, and then sets up a connection for the Java application according to the restored context in step 75.

FIG. 7 schematically shows a computer device in which the embodiments according to the present invention may be implemented.

The computer system shown in FIG. 7 comprises a CPU (Central Processing Unit) 701, a RAM (Random Access Memory) 702, a ROM (Read Only Memory) 703, a system bus 704, a Hard Disk controller 705, a keyboard controller 706, a serial interface controller 707, a parallel interface controller 708, a display controller 709, a hard disk 710, a keyboard 711, a serial external device 712, a parallel external device 713 and a display 714. Among these components, connected to system bus 704 are CPU 701, RAM 702, ROM 703, HD controller 705, keyboard controller 706, serial interface controller 707, parallel interface controller 708 and display controller 709. Hard disk 710 is connected to HD controller 705, and keyboard 711 to keyboard controller 706, serial external device 712 to serial interface controller 707, parallel external device 713 to parallel interface controller 708, and display 714 to display controller 709.

The functions of each component in FIG. 7 are well known in the art, and the architecture shown in FIG. 7 is conventional. Such an architecture applies to not only personal computers but also hand held devices such as Palm PCs, PDAs (personal data assistants), mobile telephones, etc. In different applications, for example, for implementing a user terminal containing the client module according to the present invention or a server host containing the web application server according to the present invention, some components may be added to the architecture shown in FIG. 7, or some of the components shown in FIG. 7 may be omitted. The whole system shown in FIG. 7 is controlled by computer readable instructions, which are usually stored as software in hard disk 710, EPROM or other non-volatile memory. The software can also be downloaded from the network (not shown in the figure). The software, either saved in hard disk 710 or downloaded from the network, can be loaded into RAM 702, and executed by CPU 701 for implementing the functions defined by the software.

Although the computer system shown in FIG. 7 is able to support the solution of managing a database connection according to the present invention, the computer system merely serves as an example of computer systems. Those skilled in the art may understand that many other computer system designs are also able to carry out the embodiments of the present invention.

The present invention may further be implemented as a computer program product used by, for example the computer system shown in FIG. 7, which contains code for implementing the database connection management according to the present invention. The code may be stored in a memory of other computer system prior to the usage. For instance, the code may be stored in a hard disk or a removable memory like an optical disk or a floppy disk, or may be downloaded via the Internet or other computer network.

As the preferred embodiments of the present invention have been described, those of ordinary skill in the art will appreciate that various modifications or alterations may be made without departing from the essence and scope of the present invention. Moreover, it is to be understood that the present invention is not limited to the specific embodiments disclosed here, and the scope thereof is defined by the appended claims.

What is claimed is:

1. A method for managing a database connection, the method comprising:
   in response to a connection request of a first application, allocating an available connection for the first application;
   selecting an allocated connection being held by a second application if there is no available connection;
   backing up connection context of the connection being held;
   releasing the connection being held;
   allocating the connection being held for the first application; and
   defining a key for a statement of the application for which backup was performed and establishing a correspondence between connection context of the connection being held and the key.

2. The method according to claim 1, further comprising:
   if the second application makes a request for restoring a previous connection state, allocating a new connection for the second application based on the backing up of the connection context and restoring the previous connection state.

3. The method according to claim 2, wherein the application is a Java application, and the connection is a JDBC connection.

4. The method according to claim 3, wherein the selecting comprises at least one of:
   selecting a held connection that will be released among all held connections using a Lease Recently Used algorithm; and
   selecting a held connection that has exceeded a predetermined time.

5. The method according to claim 1, wherein the key is any character that uniquely identifies a statement of each application.

6. The method according to claim 1, wherein the key is specific information of the connection context.

7. A system for managing connections in a connection pool to a database,
   the system comprising: a memory; a processor communicatively coupled to the memory; and
   a database connection manager communicatively coupled to the memory and the processor, the database connection manager for:
   backing up context of a connection; scheduling the connection, comprising:

allocating an available connection for a first application in responsive to a connection request of the first application;

selecting an allocated connection being held by a second application if there is no available connection;

backing up a connection context of the connection being held; releasing the connection being held; allocating the connection being held for the first application; and defining a key for a statement of the application for which backup was performed and establishing a correspondence between connection context of the connection being held and the key.

8. The system according to claim 7, wherein the key is any character that uniquely identifies a statement of each application.

9. The system according to claim 7, wherein the key is specific information of the connection context.

10. The system according to claim 7, wherein the database connection manager is further for allocating a new connection for the second application based on the backup of the connection context and restoring a previous connection state, in response to the second application making a request for restoring the previous connection state.

11. The system according to claim 10, wherein the application is a Java application, and the connection is a JDBC connection.

12. The system according to claim 11, wherein the selection-further comprises at least one of:

selecting a held connection that will be released among all held connections using a Lease Recently Used algorithm; and selecting a held connection that has exceeded a predetermined time.

13. The system according to claim 12, wherein the database connection manager is further for defining a key for a statement of the application for which backup was performed and establishing a correspondence between connection context of the connection being held and the key.

14. The system according to claim 13, wherein the key is any character that uniquely identifies a statement of each application.

15. The system according to claim 14, wherein the key is specific information of the connection context.

* * * * *